United States Patent
Vassilovski et al.

(10) Patent No.: US 7,463,615 B2
(45) Date of Patent: Dec. 9, 2008

(54) SYSTEM AND METHOD FOR EXTENDED SIP HEADERS FOR CDMA PARAMETERS

(75) Inventors: Dan Vassilovski, Del Mar, CA (US); Robert S. Daley, Del Mar, CA (US); Maria Marshall, Oceanside, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1328 days.

(21) Appl. No.: 09/905,510

(22) Filed: Jul. 13, 2001

(65) Prior Publication Data

US 2003/0012170 A1    Jan. 16, 2003

(51) Int. Cl.
H04B 7/216 (2006.01)
(52) U.S. Cl. .................... 370/342; 370/349; 370/352
(58) Field of Classification Search .......... 370/328, 370/329, 335, 338, 389, 392, 400, 401, 441, 370/471, 479, 342; 455/418, 419
See application file for complete search history.

(56) References Cited

U.S. PATENT DOCUMENTS

| | | | |
|---|---|---|---|
| 6,058,107 A * | 5/2000 | Love et al. ............ 370/332 |
| 6,392,999 B1 | 5/2002 | Liu et al. | |
| 6,434,391 B1 | 8/2002 | Rutan et al. | |
| 6,438,114 B1 | 8/2002 | Womack et al. | |
| 6,477,150 B1 * | 11/2002 | Maggenti et al. ............ 370/312 |
| 6,687,243 B1 * | 2/2004 | Sayers et al. ................ 370/356 |
| 6,807,173 B1 * | 10/2004 | Lee et al. ................... 370/389 |
| 2002/0034166 A1 * | 3/2002 | Barany et al. ............... 370/329 |
| 2002/0064164 A1 * | 5/2002 | Barany et al. ............... 370/401 |
| 2003/0026289 A1 * | 2/2003 | Mukherjee et al. .......... 370/466 |
| 2004/0078349 A1 * | 4/2004 | Syrjala et al. ............... 705/412 |

* cited by examiner

Primary Examiner—Wing F Chan
Assistant Examiner—Duc T Duong
(74) Attorney, Agent, or Firm—Darren M. Simon; Sandip Michas; Thomas R. Reese

(57) ABSTRACT

A wireless communication device without IP capability nonetheless communicates with an infrastructure that uses IP. To effect call set-up, an over-the-air (OTA) origination message from the wireless communication device is received by an infrastructure component, which in turn generates IP-based messages having headers that are extended to include information related to the OTA protocol. The IP-based messages with extended headers are then used internally to the infrastructure to effect call set-up.

14 Claims, 7 Drawing Sheets

REGISTER sip:registrar.qc-pbx.com SIP/2.0           /100
Via: SIP/2.0/UDP CAP1.qc-pbx.com
To: <sip:8586517777@CAP1.qc-pbx.com> /104    /106  /108
From: <sip:8586517777@CAP1.qc-pbx.com>; ESN=74020fff;IMSI_CLASS=0
Proxy-Authorization: CDMA-CAVE=1.0
 \102      AUTHR="xxxxxxxx",
           RANDC="yyyyyyyy",           110
     /112  COUNT="zzzzzzzz"
X-CDMA-ACHP: MOB_TERM=1;SCM=106;PM=0;ENCRYPTION_SUPPORTED=0;
PACA_SUPPORTED=0
Call-id:90@qc-pbx.com
CSeq: 1 REGISTER
Contact: <sip:8586517777@CAP1.qc-pbx.com>
Content-Length:0

INVITE sip:8586510000@qc-pbx.com SIP/2.0
Via: SIP/2.0/UDP CAP1.qc-pbx.com
To: <sip:8586510000@qc-pbx.com>     206\     208\
From: <sip:8586517777@CAP1.qc-pbx.com>; ESN=74020fff;IMSI_CLASS=0
Call-id:100@qc-pbx.com \204
CSeq: 1 INVITE          \202
X-CDMA-ACHP: MOB_TERM=1;SCM=106;PM=0;ENCRYPTION_SUPPORTED=0;
PACA_SUPPORTED=0     212

Contact: <sip:8586517777@CAP1.qc-pbx.com>
Content-Type: application/sdp
Content-Length:128 v=0
0=8586514321 112233 445566 IN IP4 8586517777@CAP1.qc-pbx.com
s=-
c=IN IP4 10.11.12.1
t=0 0
a=sendrec

FIG. 7

IS-95B ACCESS CHANNEL PARAMETER DETAILS

| IS95B ACCESS CHANNEL PARAMETER | DESCRIPTION | SIP FIELD |
|---|---|---|
| MSID | MOBILE STATION IDENTIFICATION NUMBER OR COMBINATION OF NUMBERS USED TO UNIQUELY IDENTIFY THE MOBILE TO THE INFRASTRUCTURE. THE MSID CONSISTS OF THE MOBILE ESN (ELECTRONIC SERIAL NUMBER), IMSI (INTERNATIONAL MOBILE STATION IDENTIFY), IMSI AND ESN, OR TMSI (TEMPORARY MOBILE STATION IDENTIFY). | • FROM HEADER<br>• CONTACT HEADER<br>• X-CDMA HEADER |
| AUTHR | AUTHENTICATION RESPONSE<br>AN 18-BIT OUTPUT OF THE CDMA AUTHENTICATION ALGORITHM, USED TO VALIDATE MOBILE STATION ORIGINATIONS, REGISTRATIONS AND TERMINATIONS. | • 407 PROXY AUTHENTICATE EXTENSION |
| RANDC | THE 6 MOST SIGNIFICANT BITS OF RAND, THE RANDOM NUMBER ISSUED BY THE INFRASTRUCTURE FOR INPUT TO THE CDMA AUTHENTICATION ALGORITHM. | • 407 PROXY AUTHENTICATE EXTENSION |
| COUNT | CALL HISTORY PARAMETER<br>COUNTER MAINTAINED BY THE MOBILE AND THE AUTHENTICATION CENTER OF THE NUMBER OF MOBILE CALL ATTEMPTS. USED TO ASSIST IN IDENTIFYING CLONE MOBILE STATIONS. | • 407 PROXY AUTHENTICATE EXTENSION |
| IMSI_CLASS | USED TO DENOTE WHAT COMPONENTS ARE USED TO IDENTIFY THE MOBILE STATION TO THE INFRASTRUCTURE | • FROM HEADER<br>• CONTACT HEADER<br>• X-CDMA HEADER |
| MOB_TERM | MOBILE STATION TERMINATION INDICATOR<br>SET TO '1' IF THE MOBILE CAN TERMINATE CALLS IN ITS CURRENT ROAMING STATUS | • X-CDMA HEADER |
| MOB_P_REV | MOBILE STATION PROTOCOL REVISION<br>USED TO DETERMINE IF THE PROTOCOL REVISIONS SUPPORTED BY THE MOBILE STATION AND THE INFRASTRUCTURE ARE COMPATIBLE. | • X-CDMA HEADER |

FIG. 8

| IS95B ACCESS CHANNEL PARAMETER | DESCRIPTION | SIP FIELD |
|---|---|---|
| SPECIAL_SERVICE | SPECIAL SERVICE OPTION INDICATOR USED BY THE MOBILE TO INDICATE A REQUEST FOR A SERVICE OPTION OTHER THAN THE DEFAULT SERVICE OPTION | ▪ SDP "m" (MEDIA INFORMATION) HEADER FIELD.<br>▪ MAY ALSO BE PART OF THE SDP "a" (MEDIA ATTRIBUTE) HEADER FIELD. |
| SERVICE_OPTION | SERVICE OPTION INDICATOR USED BY THE MOBILE STATION TO INDICATE A REQUEST FOR A SPECIFIC SERVICE OPTION | ▪ SDP "m" (MEDIA INFORMATION) HEADER FIELD.<br>▪ MAY ALSO BE PART OF THE SDP "a" (MEDIA ATTRIBUTE) HEADER FIELD. |
| PM | PRIVACY MODE INDICATOR USED TO INDICATE OVER-THE-AIR PRIVACY MODE. | ▪ X-CDMA HEADER |
| CHARI | DIALED DIGIT OR CHARACTER INDICATES WHAT FORMAT DIALED DIGITS ARE SENT, EITHER DMTF OR ASCII | ▪ TO HEADER |
| PACA | PRIORITY ACCESS AND CHANNEL ASSIGNMENT A PRIORITY MOBILE-ORIGINATED CALL FOR WHICH THERE IS NO OTA RESOURCE AVAILABLE WHEN THE CALL IS ORIGINATED; WHICH HAS BEEN QUEUED FOR PRIORITY ACCESS CHANNEL ASSIGNMENT. | ▪ X-CDMA HEADER |
| ENCRYPTION_SUPPORTED | INDICATES SUPPORT FOR OTA ENCRYPTION OF CDMA SIGNALING. | ▪ X-CDMA HEADER |

FIG. 8 (con't.)

SYSTEM AND METHOD FOR EXTENDED SIP HEADERS FOR CDMA PARAMETERS

FIELD OF THE INVENTION

The present invention relates generally to enabling a wireless telephone that is not required or generally configured to support voice over Internet Protocols (VOIP) to nonetheless communicate with wireless telephone infrastructure that uses IP structures or architectures, with IP-based communication between the wireless telephone infrastructure and any VOIP-based infrastructure being supported.

BACKGROUND OF THE INVENTION

Wireless telephones, such as but not limited to wireless telephones that communicate using Code Division Multiple Access (CDMA) spread spectrum modulation techniques, communicate over the air with system infrastructure using wireless telephone over-the-air communication protocols, e.g., the CDMA protocols known as IS-95A, IS-95B, and IS-2000. The system infrastructure, which can include base stations (BTS), base station controllers (BSC), and other components, connects the wireless telephone to another communication device, such as a through land line or another wireless communication system.

In the case of CDMA, voice data is sent over the air in packets that are collected by the infrastructure and assembled into a voice stream, transparently to the speakers who are talking to each other. As might be expected, the over-the-air protocol is tailored to optimize wireless communication. For instance, to maximize over-the-air capacity, the over-the-air protocol contains a minimum of signalling information, and the size of a voice data packet is relatively small.

With the growth of the Internet, computer-to-computer communication using Internet Protocols (IP) has become ubiquitous. Furthermore, it has become desirable not only to facilitate computer data communication using IP, but to facilitate voice communication using IP as well. As but one advantage afforded by using IP in a telephony infrastructure, much hardware such as switches can be eliminated, and existing computers and software can be used instead, reducing cost. To this end, so-called voice over IP (VOIP) has been introduced.

To support VOIP, a communication device must have, among other requirements, IP capability, i.e., the device must itself be able to communicate using IP, and it must have an IP address.

The present invention critically observes, however, that requiring a wireless telephone to use VOIP diminishes over-the-air capacity because VOIP is not necessarily designed to maximize such capacity. Instead, VOIP accounts for design considerations that are not necessarily related to wireless telephony. As an example, the data packet size of VOIP is relatively large, compared to the packet size used throughout the wireless communication industry such as in wireless telephones using over-the-air protocols such as IS-95. Indeed, a typical packet size in the IS-95 protocol is less than the size of a single packet header employed in a typical IP. Moreover, configuring a wireless telephone to communicate using both IP and over-the-air protocols complicates telephone design, adversely strains available resources (e.g., power, computing cycles, coding, and so on), and increases costs.

Nonetheless, the present invention understands that it would be desirable to enable wireless protocol-based communication, such as CDMA, for the over-the-air (OTA) portion of a call, while using an infrastructure that transmits data internally in accordance with IP principles. The present invention further understands that in communicating OTA protocol-carried call set-up data from a wireless telephone to various components inside an IP-enabled telephony infrastructure, it would be preferable to use an existing IP-based call set-up protocol, instead of creating an entirely new protocol. With the above considerations in mind, the present invention provides the solutions disclosed below.

SUMMARY OF THE INVENTION

A communication system includes a Session Initiation Protocol (SIP) header that contains information which is derived at least in part from an over-the-air (OTA) protocol message from a wireless communication device. A telephony infrastructure component receives the information for use thereof in establishing communication with the wireless communication device.

In a preferred embodiment the OTA protocol message is a code division multiple access (CDMA) initiation request message. The information can represent CDMA call setup parameters that are related to the OTA protocol and are not related to voice over Internet Protocol (VOIP) communication within the infrastructure. The information can also represent certain in-call parameters related to the OTA protocol and not related to the VOIP protocol. In a non-limiting example, the information may include a station classmark that represents wireless telephone power. The information may also include authentication data. As other examples, the information can represent whether a signalling encryption is supported by the wireless communication device, and/or the information can represent MOB_TERM status of the wireless communication device.

In any case, in one non-limiting implementation the header can be part of an SIP Invite Request message. Or, the header can be part of an SIP Register Request. As discussed in greater detail below, the preferred header can be part of an SIP message from a virtual IP endpoint, and the information can represent communication from a non-IP enabled CDMA telephone.

In another aspect, a method for facilitating communication between a wireless communication device transmitting information using an over-the-air (OTA) protocol and a telephony infrastructure using IP protocol to communicate information within the infrastructure includes adding data in an IP message header representing at least one OTA network parameter.

In still another aspect, in a wireless communication device infrastructure that transmits information internally to the infrastructure using Internet Protocol (IP) messages, a message is sent from a virtual IP endpoint within the infrastructure. The message represents communication from a wireless communication device transmitting information using an over-the-air (OTA) protocol that is different from IP.

In another aspect, a communication method includes using extended session initiation protocol (SIP) headers to transmit over-the-air (OTA) protocol parameters within an infrastructure that uses voice over Internet Protocols (VOIP), such that a protocol other than VOIP need not be used within the infrastructure to effect call set-up between a wireless communication device and another communication device via the infrastructure.

The details of the present invention, both as to its structure and operation, can best be understood in reference to the accompanying drawings, in which like reference numerals refer to like parts, and in which:

BRIEF DESCRIPTION OF THE DRAWINGS

FIG. 6 is an illustration of a Session Initiation Protocol (SIP) header for an SIP Invite Request as extended by the present invention;

FIG. 7 is an illustration of an SIP header for an SIP Register Request as extended by the present invention; and FIG. 8 is a table showing exemplary, non-limiting OTA protocol messages and their corresponding IP messages.

DETAILED DESCRIPTION OF THE PREFERRED EMBODIMENT

Figure 1:
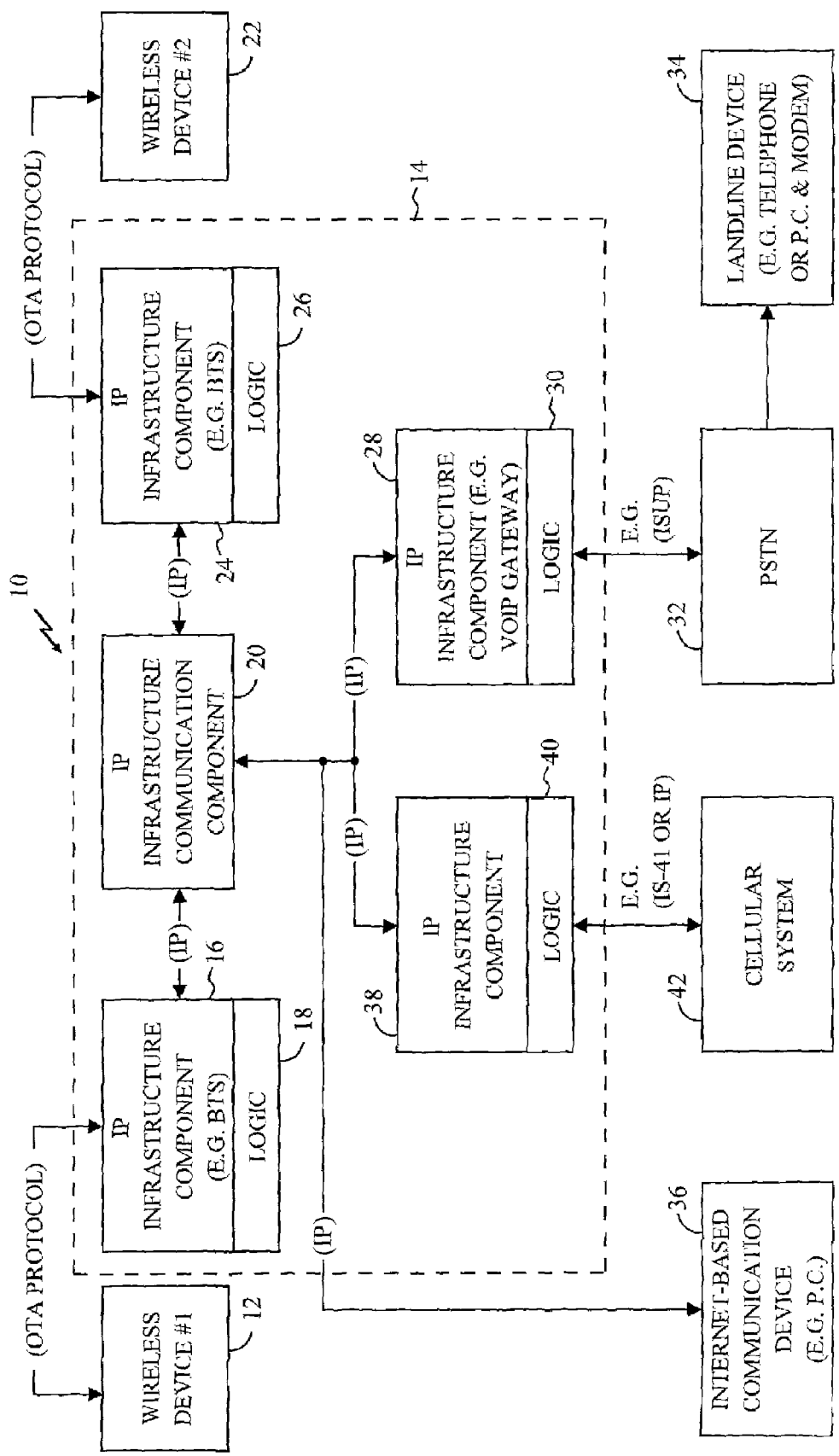
FIG. 1 is a block diagram of a presently preferred inventive wireless communication system.

Referring initially to FIG. 1, a system is shown, generally designated 10, for effecting communication between a target wireless communication device 12 that does not support voice over Internet Protocols (VOIP) and a telephony infrastructure 14 that supports IP. By "does not support VOIP" or "does not support IP" is meant that the device 12 either has no IP or VOIP capability, or that it has such capability but for improved performance uses a standard over the air (OTA) protocol such as a spread spectrum scheme like CDMA or WCDMA or other wireless protocol such as but not limited to TDMA, UMTS, TD-SCDMA, etc. to communicate with the infrastructure 14. In one non-limiting embodiment the device 12 is a mobile telephone made by Kyocera, Samsung, or other manufacturer that uses Code Division Multiple Access (CDMA) principles and CDMA over-the-air (OTA) communication air interface and includes protocols such as defined in but not limited IS-95A, IS-95B, UCDMA, IS-2000, and others to communicate with the infrastructure 14.

For instance, the wireless communication systems to which the present invention can apply, in amplification to those noted above, include Personal Communications Service (PCS) and cellular systems, such as Analog Advanced Mobile Phone System (AMPS) and the following digital systems: CDMA, Time Division Multiple Access (TDMA), and hybrid systems that use both TDMA and CDMA technologies. A CDMA cellular system is described in the Telecommunications Industry Association/Electronic Industries Association (TIA/EIA) Standard IS-95. Combined AMPS and CDMA systems are described in TIA/EIA Standard IS-98. Other communications systems are described in the International Mobile Telecommunications System 2000/Universal Mobile Telecommunications Systems (IMT-2000/UM), standards covering what are referred to as wideband CDMA (WCDMA), cdma2000 (such as cdma2000 1× or 3× standards, for example) or TD-SCDMA.

The present invention applies to any wireless communication device 12; for illustration it will be assumed that the device 12 is a telephone 12. In general, wireless communication devices to which the present invention applies may include but are not limited to a wireless handset or telephone, a cellular phone, a data transceiver, or a paging and position determination receiver, and can be hand-held, or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems.

As shown in FIG. 1, the wireless telephone 12 communicates, using one or more of the above-mentioned systems, with at least one first infrastructure component 16 that accesses a logic module 18 to execute the logic of the present invention. The first component 16 preferably is a base station (BTS), but it can also be implemented by base station controller (BSC), mobile switching center (MSC), gateway to a satellite system, or other infrastructure component. In any case, the first component 16 not only supports the necessary protocols and systems to communicate with the wireless device 12, but also supports IP and attendant protocols or stack of IP protocols, and accordingly communicates with a coordinating infrastructure component 20 such as a BSC or another BTS using IP. In turn, when the target wireless telephone 12 is to communicate with a second wireless telephone 22 in the same infrastructure 14 system, the coordinating component 20 communicates via IP with a second infrastructure component 24 such as a second BTS, which in turn executes a logic module 26 to communicate, using OTA protocol, with the second wireless telephone 22.

The infrastructure components 16, 24 thus communicate with their respective wireless telephones 12, 22 using OTA protocol but communicate internally to the infrastructure 14 using IP, thereby relieving the wireless telephones 12, 22 from having to support IP and attendant suite of voice over Internet protocols or from having to support any processing, use of resources, etc. related to implementing IP. Also, by using IP internally to the infrastructure 14 and OTA protocol between the telephones 12, 22 and the respective components 16, 24, the advantages of using IP internal to the infrastructure 14 are realized, whereas the advantages of OTA protocol in wireless communication to the telephones 12, 22 are preserved to maximize the over-the-air capacity of the system 10. Accordingly, the infrastructure components 16, 24 can be thought of as virtual IP endpoints, with the actual communication endpoints being the telephones 12, 22.

FIG. 1 further shows that the target wireless telephone 12 can also communicate with communication devices outside of the infrastructure 14. Specifically, the infrastructure 14 can include a VOIP gateway 28 with logic module 30 for communicating, in accordance with principles known in the art, with the coordinating infrastructure component 20 and with a public switch telephone network (PSTN) 32. The communication between the coordinating component 20 and the VOIP gateway 28 can be via IP, whereas the communication between the VOIP gateway 28 and the PSTN 32 can be via a signalling protocol such as ISUP using a physical system such as the system known as SS7. In turn, the PSTN includes one or more landline devices 34 such as telephones or modems, to complete the communication pathway between the target wireless telephone 12 and the landline devices 34.

Additionally, the target wireless telephone 12 can communicate with an Internet-based communication device 36 such as a personal computer (PC), data server, intranet portal, or other computer. The Internet-based device 36 communicates with the coordinating infrastructure component 20 using IP.

Still further, the infrastructure 14 can include an interface component 38 with logic module 40 for communicating with the coordinating component 20 within the infrastructure 14 and with wireless communication systems 42 that are outside of the infrastructure 14. For example, the interface component 38 can be a mobile switching center (MSC) or gateway. Communication between the interface component 38 and coordinating component 20 can use IP, whereas communication between the interface component 38 and the other wireless/cellular systems 42 can use IS-41 protocol or IP.

With the above overview of the present architecture in mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer, controller, processor, etc.) to perform a sequence of function steps corresponding to those shown.

In other words, the logic may be embodied by a computer program that is executed by a processor within, e.g., the infrastructure component 16 as a series of computer- or control element-executable instructions. These instructions may reside, for example, in RAM or on a hard drive or optical drive, or the instructions may be stored on magnetic tape, electronic read-only memory, or other appropriate data storage device that can be dynamically changed or updated.

Figure 2:
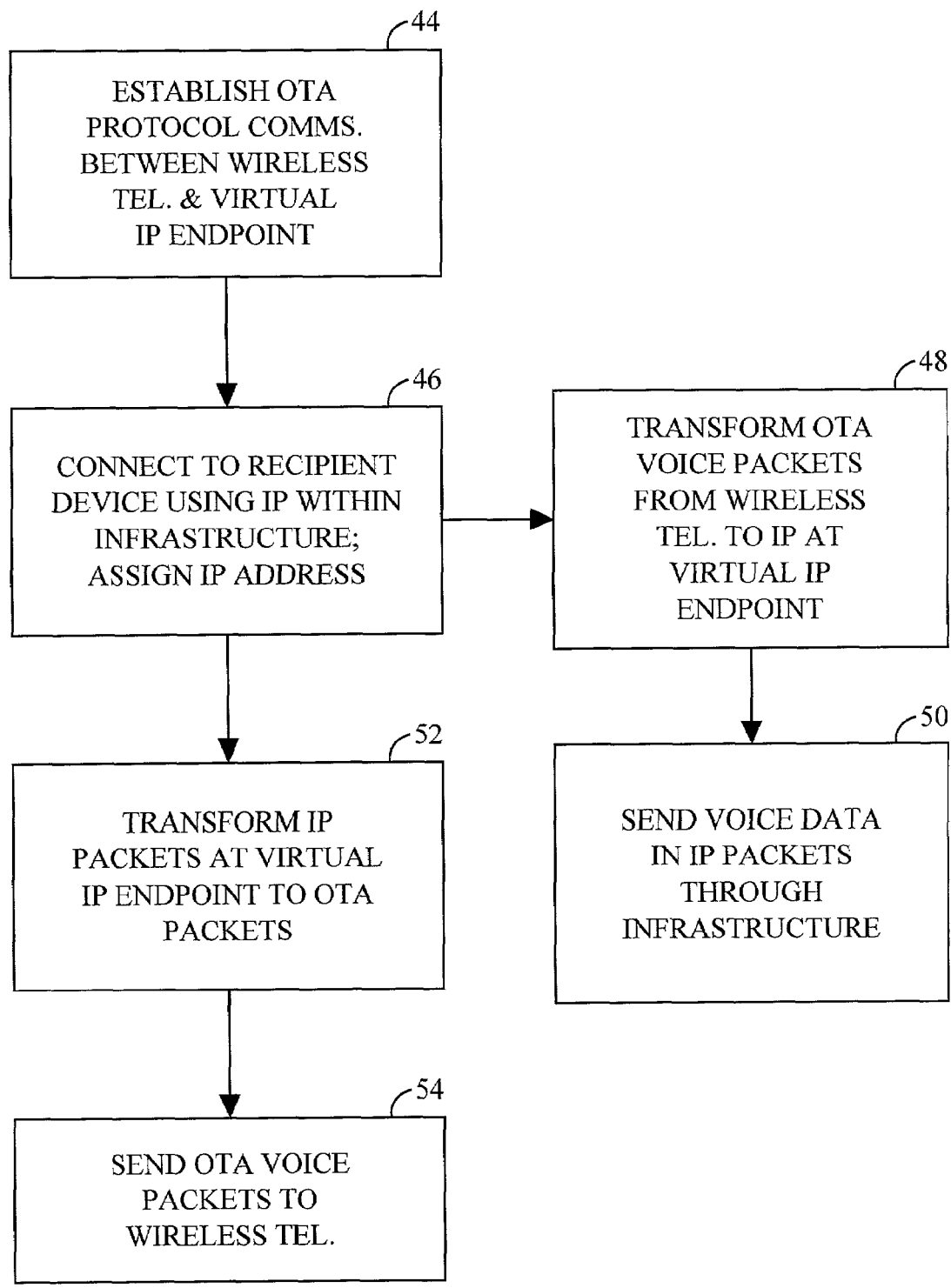
FIG. 2 is a flow chart of the logic for communicating with a non-IP-based wireless device using an IP-enabled infrastructure when the wireless device establishes and maintains the call.

Now referring to FIG. 2, the logic that is executed when the target wireless telephone 12 places a call is shown. Commencing at step 44, communication using an appropriate over-the-air (OTA) protocol is established between the telephone 12 and the first component 16, i.e., between the telephone 12 and the virtual IP endpoint of the present invention. In one exemplary, non-limiting embodiment, the process at step 44 can include receiving a CDMA protocol origination message from the telephone 12 in, for example, IS-95 protocol, and then in response essentially transforming the origination message to IP by sending an IP-based Session Initiation Protocol (SIP) messages from the first component 16 to other appropriate server components within the infrastructure 14 in accordance with principles known in the art. These SIP messages can ascertain the location of the telephone 12 and establish communications with the intended recipient's endpoint. In the case wherein the recipient is the second wireless telephone 22, IP communication is established between the virtual endpoints which are established by the components 16, 24.

Proceeding to step 46, the infrastructure 14 connects to the recipient device using the above-disclosed IP messaging in the infrastructure 14. In the case of the second wireless telephone 22 being the recipient, the second component 24 establishes communication with the telephone 22 using OTA protocol messages. In contrast, when the recipient is the Internet-based communication device 36, IP communication is established in accordance with principles known in the art between the device 36 and the infrastructure 14. On the other hand, when the recipient is the cellular system 42, communication is established between the infrastructure 14 and the system 42 using IP or other protocol known in the art, e.g., IS-41. Still further, when the landline 34 is contacted, communication is established between the infrastructure 14 and the PSTN 32 using a protocol known in the art, such as ISUP. Also, as indicated in FIG. 2 an IP address is assigned to the telephone 12. The details of how IP addresses are assigned are discussed further below in reference to FIGS. 4 and 5.

Once communication is established, the processing can perform parallel tasks steps 48 and 52. At step 48, OTA packets such as OTA voice packets from the wireless telephone 12 are transformed or otherwise converted to IP at the virtual IP endpoint, i.e., the first component 16. To make this transformation, the contents of the OTA voice packets are rearranged as appropriate to conform to IP packet requirements. Typically, since OTA voice packets are smaller than IP packets and frequently are smaller than the headers of IP packets, several OTA packets might be combined into a single IP packet, although this might not necessarily be the case particularly for latency intensive applications. The information in IP, which can represent voice, digital data, digitized image data, or other type of data is sent through the infrastructure 14 toward the recipient at step 52.

Likewise, at step 52 IP packets representing information that originated at the recipient device move through the infrastructure 14 and are converted to OTA packets by the first component 16, i.e., by the virtual IP endpoint. The OTA packets are sent to the telephone 12 at step 54. The transformation from IP to OTA protocol is the reverse of the process for converting OTA packets to IP packets, i.e., each IP packet might be separated into a set of smaller OTA packets as appropriate to conform to the OTA protocol used by the telephone 12.

Figure 3:
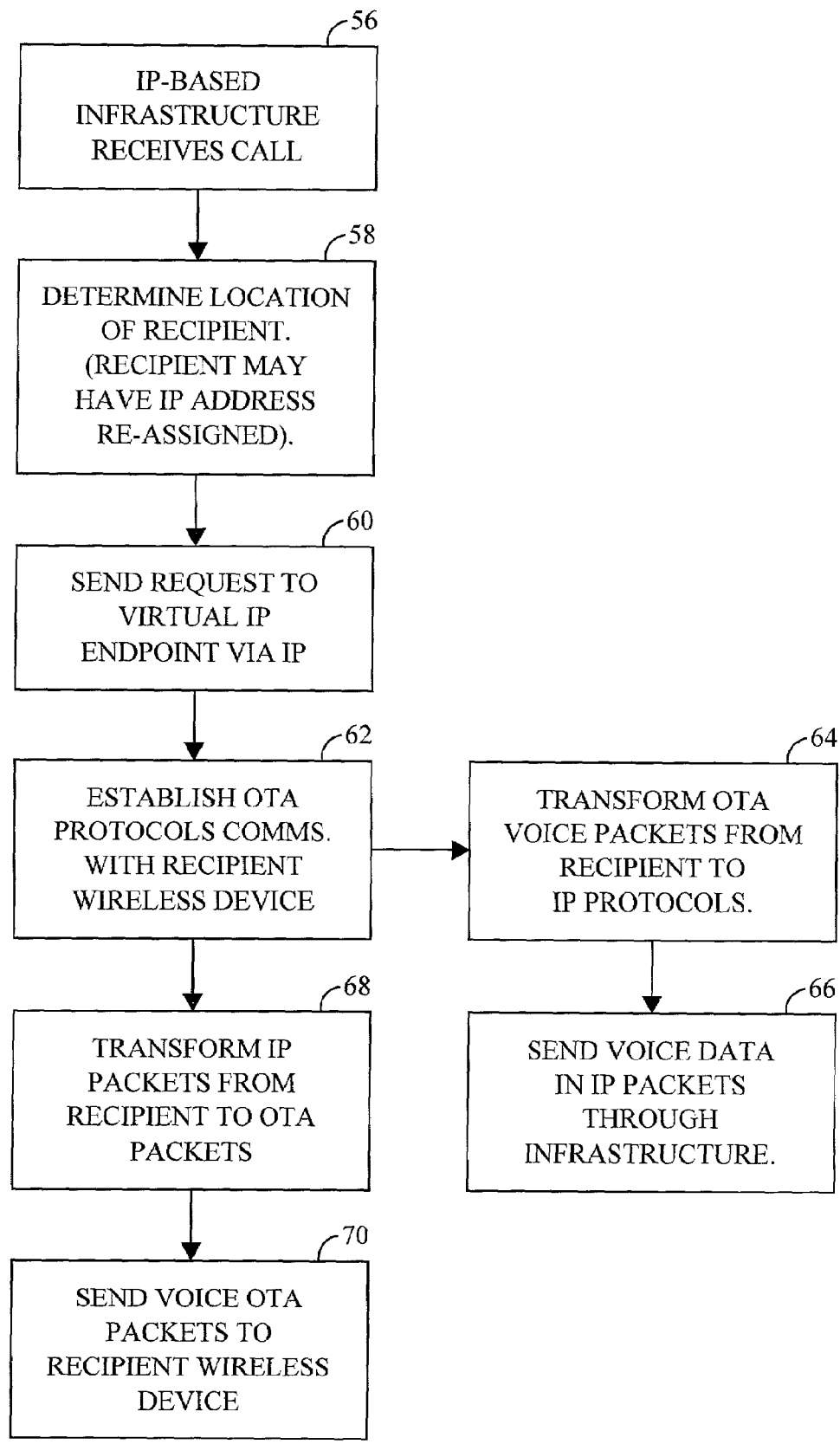
FIG. 3 is a flow chart of the logic for communicating with a non-IP wireless telephone using an IP-enabled infrastructure when the wireless telephone is called.

FIG. 3 shows the logic that is invoked when the telephone 12 is contacted. Commencing at step 56, the infrastructure receives a call request for the telephone 12. At step 58, the location of the telephone 12 is determined in accordance with locating principles known in the art, e.g., global positioning satellite or known network techniques. Typically, the location is established by the telephone 12 being detected by one or more base stations, with the closest detecting base station location being known. The call request is sent to the virtual IP endpoint (i.e., the first component 16) via IP at step 60.

Moving to step 62, OTA protocol communications are established with the telephone 12. Then, OTA protocol packets from the telephone 12 are transformed to IP and sent through the infrastructure 14 at steps 64 and 66 in accordance with principles discussed above. Also, IP packets representing information intended for the telephone 12 are converted to OTA protocol packets and sent over the air to the telephone 12 at steps 68 and 70 in accordance with principles discussed above.

Figure 4:
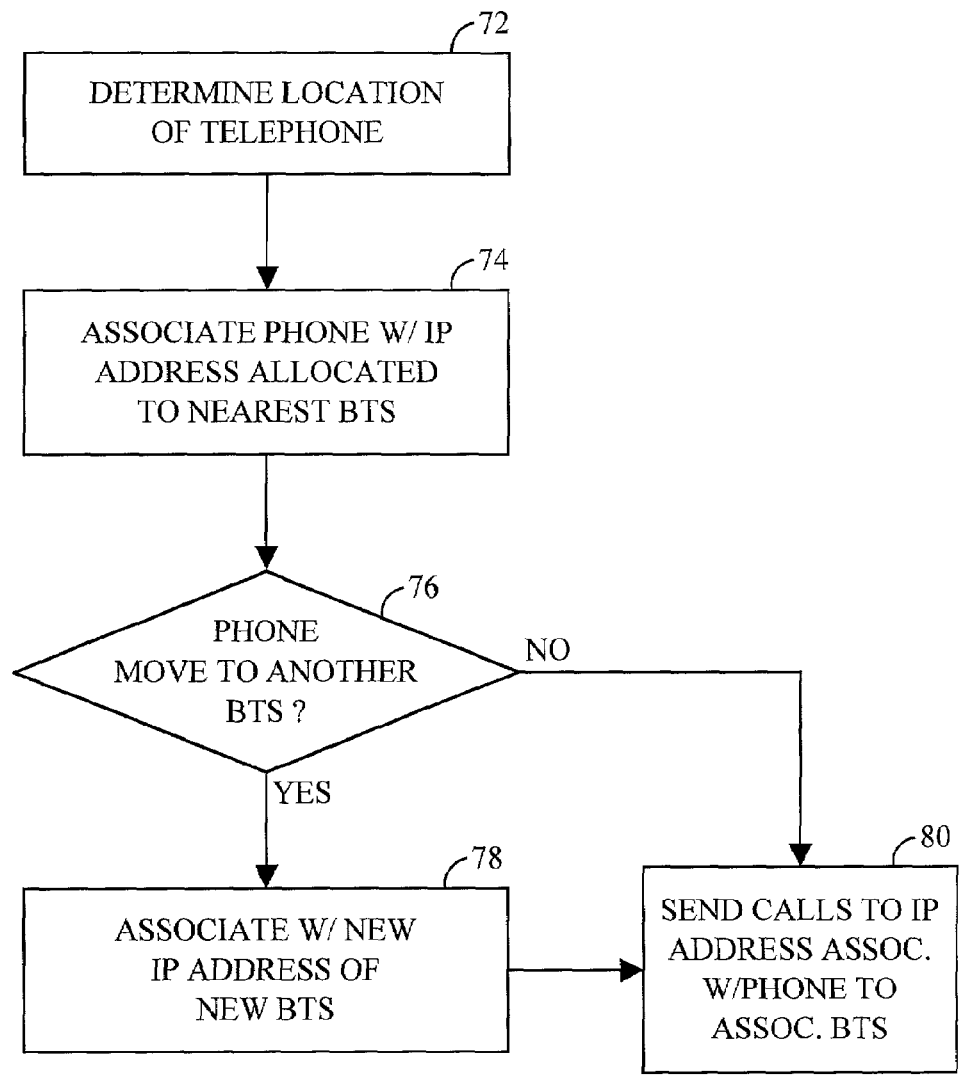
FIG. 4 is a flow chart of a first method for assigning an IP address to a wireless telephone.

FIG. 4 shows one method for paging the telephone 12 by assigning a temporary IP address to the telephone 12. By "paging" generally is meant "contacting" or "periodically establishing a connection". Commencing at step 72, the location of the telephone is determined in accordance with principles known in the art. Moving to step 74, an IP address that has been allocated to the receiving virtual IP endpoint (e.g., to the BTS closest to the telephone 12) is associated with the telephone 12. This address is recorded in the infrastructure 14 in, e.g., table lookup form, as being the address of the telephone 12. By "IP address" is meant an address useful in identifying intended recipients of IP packets. This can include a conventional IP address numeric string and/or an alpha-numeric address associated with the string. In one non-limiting example, the alpha-numeric address can be the telephone number of the telephone 12 with an IP identifier appended thereto, e.g., 5551212@qualcomm.com. More generally, the IP address can include a wireless device identification such as an electronic serial number.

Next, if it is determined at step 76 that the telephone 12 has moved into the area of another BTS, the process proceeds to step 78 to associate an IP address allocated to the new BTS with the telephone 12. In any case, when a call is received for the telephone 12 the process proceeds to step 80 to page the telephone 12. A page message may include the contents conventionally delivered to BTS by MSC when paging a cellular device using existing cellular infrastructure protocols. These contents may include the destination wireless telephone 12 identifier and details regarding the desired communication. The BTS may subsequently transmit OTA page messages to the telephone 12.

Once the telephone 12 answers the page, communication is established as set forth above, using the temporary IP address of the telephone 12 to route IP information through the infrastructure 14. That is, information intended for the telephone 12 is associated with the IP address of the telephone 12, and then sent to the virtual IP endpoint for conversion thereof to OTA protocol and transmission to the telephone 12.

Figure 5:
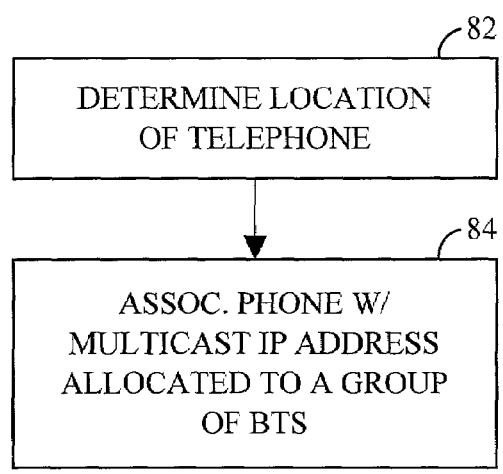
FIG. 5 is a flow chart of a second method for assigning an IP address to a wireless telephone.

While the logic of FIG. 4 provides for highly efficient paging process, FIG. 5 shows a method for minimizing the assignment of temporary IP addresses to wireless telephones in the system 10 and, hence, to minimize the number of messages that must be used for assigning IP addressed to wireless telephones. Commencing at step 82, the location of the wireless telephone 12 is determined. Proceeding to step 84, the telephone 12 is associated with an IP address that is a multicast address allocated to more than one virtual IP endpoint, e.g., that is an address allocated to a group of BTS or other such component. In this embodiment, the page message is transmitted to the multicast IP address associated with the telephone 12, i.e., is transmitted to each BTS in the multicast group. The virtual IP endpoints in the multicast group then transmit OTA pages to the wireless telephone 12, and communication is established between the infrastructure 14 and the wireless telephone 12.

Because the contents of the page message sent to the multicast address specifies the target wireless telephone 12, a single IP multicast address can be associated with multiple wireless telephones, thereby simplifying tracking requirements on the system 10.

As discussed above, wireless telephones such as CDMA telephones must convey over the air-specific parameters to the telephony infrastructure beyond those required to establish communication over a VOIP-based infrastructure. These parameters are then conventionally transmitted through the infrastructure using proprietary interfaces between base stations (BTS) and base station controllers (BSC). Being directed to an infrastructure that uses IP, however, the present invention understands that the over the air-specific parameters preferably be transmitted through the infrastructure using IP, and accordingly provides the solutions disclosed below.

More specifically, referring to FIGS. 6 and 7, two SIP "methods" are shown that can be used to transmit, through the infrastructure 14 using SIP, OTA parameters received from the wireless telephone 12 by the virtual IP endpoint, i.e., by the infrastructure component 16, via messages in OTA protocol format (such as but not limited to IS-95 messages). It is to be understood that SIP "methods" other than the two illustrated in FIGS. 6 and 7 can be extended in accordance with present principles to convey OTA parameters through the infrastructure 14. In any case, the SIP messages disclosed below convey call set-up parameters necessary for the OTA portion of a call but not related to voice over Internet Protocol (VOIP) communication within the infrastructure 14.

FIG. 6 shows a header, extended in accordance with the present invention, for an SIP Register Request, generally designated 100, which is sent from the virtual IP endpoint (BTS component 16) to the coordinating component 20 (BSC) as part of the process for registering the telephone 12 with the system 10 when the telephone 12 is initially detected. The header 100 can be generated in response to, e.g., a CDMA initiation request message. As set forth below, the header 100 contains OTA network parameters, in addition to conventional SIP information.

In one implementation, the "from" line 102 of the extended header 100 includes a URL 104 associated with the wireless telephone 12, with the URL being a concatenation of the phone number of the telephone 12 ("8586517777") and a portion of a URL associated with the virtual IP endpoint ("CAP1.qc-pbx.com"). Thus, in one implementation the telephone 12 has a URL that in part includes its phone number.

Furthermore, the "from" line 102 contains additional identifying information not normally required for conventional IP devices, namely, an ESN identifier 106 and an IMSI_CLASS identifier 108. Additionally, the header 100 includes wireless telephone authentication information 110 that is CDMA-specific and thus not normally required in the header for a conventional SIP Register Request. This information is classmark information that represents telephone power and/or authentication data.

As also shown in FIG. 6, an entire new line can be added to the header 100 to convey certain OTA-specific information not normally required in SIP messages. More particularly, an "x"-line 112 can be added to the header 100 to convey such CDMA-specific information as MOB_TERM, SCM, PM, ENCRYPTION_SUPPORTED, and PACA_SUPPORTED parameters. Thus, the header 100 can contain information that, among other things, represents whether a signalling encryption is supported by the wireless telephone 12. The "x" indicates to IP components not programmed to recognize the line 112 that the line 112 can be ignored by those components.

It is to be understood that further OTA parameters can be included in the extended header 100, as required by the particular OTA protocol and infrastructure 14 being used, and that the present invention is not to be limited to the specific parameters set forth above. In any case, the remainder of the header 100 is conventionally formatted in accordance with SIP principles known in the art for effecting IP-based communication within the infrastructure 14.

FIG. 7 shows a header, generally designated 200, for an SIP Invite Request that is sent from the virtual IP endpoint (BTS component 16) to the coordinating component 20 (BSC) as part of the process for establishing a call with the telephone 12, in response to an OTA protocol message from the telephone 12. In one implementation, the "from" line 202 of the extended header 200 includes a URL 204 associated with the wireless telephone 12. Furthermore, the "from" line 202 contains additional identifying information not normally required for conventional IP devices, namely, an ESN identifier 206 and an IMSI_CLASS identifier 208. Additionally, the header 200 includes an "x"-line 212 that conveys such CDMA-specific information as MOB_TERM, SCM, PM, ENCRYPTION_SUPPORTED, and PACA_SUPPORTED parameters.

As mentioned above, the present invention encompasses other SIP header extensions to convey OTA and specifically CDMA parameters to the IP infrastructure. For instance, the SIP header can be an SIP Content Disposition header having defined types corresponding to OTA parameters. OTA (e.g., CDMA) specific types can be defined in the header to delineate that portions of the SIP message body are OTA (e.g., CDMA) specific parameters. In multi-part message bodies, different parts can have different Content Disposition types specified in the header.

In addition, the SIP header can include a short message service (SMS) media type that indicates that the message body contains OTA SMS data. The SMS media type signals to the IP endpoint that it is to use existing OTA delivery techniques to convey SMS data to the wireless endpoint.

As yet a further example, the SIP header can be an SIP Invite header, and the header can include an email media type that indicates that the message body contains OTA email text data. In this way, the IP endpoint can differentiate an email data stream from, e.g., a data stream representing voice packets, which would be otherwise undifferentiable in an IP network. The email media type thus signals the IP endpoint to use a packet data service option when delivering the data to the wireless endpoint instead of a voice service option.

Alternatively, the IP endpoint can initiate delivery of the email message by sending a sequential series of IS-95 or other OTA protocol Alert With Information messages, similar to the manner in which a sequence of short messages are currently delivered in IS-95 systems. Furthermore, the IP endpoint may send an IS-95 or other OTA protocol message Alert With Information message informing the wireless endpoint that email exists for delivery, and requesting that the wireless endpoint select a delivery option, which can include one of the above options as well as the option of translating the email to voice using principles known in the art and then sending the voice translation to the wireless endpoint using a voice delivery option.

In addition, the present invention recognizes that when the OTA protocol is, e.g., a CDMA protocol, some CDMA identification data should be restricted to the cellular system and need not be conveyed to the IP infrastructure. That is, a CDMA wireless endpoint should be able to selectively identify itself to the IP infrastructure for registration and authorization using its full CDMA identity but identify itself to receiving parties using only its SIP URL.

Accordingly, an originating IP endpoint (i.e., an IP endpoint receiving a call request from a wireless endpoint) can issue an initial SIP Invite message to an SIP Redirect Server in the infrastructure and receive in return the full address of the requested destination party, subsequent to an optional authentication of the originating wireless endpoint. The SIP Invite uses the originating wireless endpoint's full CDMA address for, e.g., authentication. Once authentication is successful, the originating IP endpoint reformulates the original SIP Invite request to address the destination party directly, but using only the SIP URL information corresponding to the originating wireless endpoint. Thus, the first SIP Invite message contains some CDMA-specific parameters that are not required for SIP VOIP communication, while subsequent to authentication the second SIP Invite message contains only parameters that are required for SIP VOIP communication and that consequently excludes CDMA-specific parameters which are not required for SIP VOIP communication.

While the particular SYSTEM AND METHOD FOR EXTENDED SIP HEADERS FOR CDMA PARAMETERS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A system, comprising:
   at least one Session Initiation Protocol (SIP) header generated by a first telephony infrastructure component for a SIP message, the header including information derived at least in part from an over-the-air (OTA) protocol message from a wireless communication device; and
   at least one second telephony infrastructure component operable to receive the SIP message for use thereof in establishing communication with the wireless communication device,
   wherein the OTA protocol message is a code division multiple access (CDMA) initiation request message, the information represents CDMA call set-up parameters that are related to the OTA protocol and are not related to voice over Internet Protocol (VOIP) communication within the infrastructure, and the information includes at least one station classmark that represents at least the wireless communication device power.

2. A system, comprising:
   at least one Session Initiation Protocol (SIP) header generated by a first telephony infrastructure component for a SIP message, the header including information derived at least in part from an over-the-air (OTA) protocol message from a wireless communication device; and
   at least one second telephony infrastructure component operable to receive the SIP message for use thereof in establishing communication with the wireless communication device,
   wherein the OTA protocol message is a code division multiple access (CDMA) initiation request message, the information represents CDMA call set-up parameters that are related to the OTA protocol and are not related to voice over Internet Protocol (VOIP) communication within the infrastructure, and the information represents whether a signaling encryption is supported by the wireless communication device.

3. A system, comprising:
   at least one Session Initiation Protocol (SIP) header generated by a first telephony infrastructure component for a SIP message, the header including information derived at least in part from an over-the-air (OTA) protocol message from a wireless communication device; and at least one second telephony infrastructure component operable to receive the SIP message for use thereof in establishing communication with the wireless communication device, wherein the OTA protocol message is a code division multiple access (CDMA) initiation request message, the information represents CDMA call set-up parameters-that are related to the OTA protocol and are not related to voice over Internet Protocol (VOIP) communication within the infrastructure, and the information represents MOB_TERM status of the wireless communication device.

4. A system, comprising:

at least one Session Initiation Protocol (SIP) header generated by a virtual Internet Protocol (IP) endpoint component for a SIP message, the header including information derived at least in part from an over-the-air (OTA) protocol message from a wireless communication device; and at least one telephony infrastructure component operable to receive the SIP message for use thereof in establishing communication with the wireless communication device, wherein the OTA protocol message is a code division multiple access (CDMA) initiation request message, the information represents CDMA call set-up parameters-that are related to the OTA protocol and are not related to voice over Internet Protocol (VOIP) communication within the and the information represents communication from a non-IP enabled CDMA communication device.

5. A method for facilitating communication between a wireless communication device transmitting information using an over-the-air (OTA) protocol and a telephony infrastructure using IP protocol to communicate information within the infrastructure, comprising:

adding data in at least one Session Initiation Protocol message header representing at least one OTA network parameter, wherein the parameter is related to the OTA protocol but not to voice over IP (VOIP) protocol used within the infrastructure, wherein the parameter includes a station classmark and the classmark represents at least the wireless communication device power.

6. A virtual Internet Protocol (IP) endpoint component disposed in a wireless communication device infrastructure, comprising:

a Session Internet Protocol (SIP) message generator operable to generate a SIP message having a header that includes information derived at least in part from an over-the-air (OTA) protocol message from a wireless communication device the information represents CDMA call set-up parameters that are related to the OTA protocol and are not related to voice over Internet Protocol (VOIP) communication within the infrastructure, and the information includes at least one station classmark that represents wireless telephone power; and a communications module operable for communicating the SIP message to the wireless communication device infrastructure.

7. A virtual Internet Protocol (IP) endpoint component disposed in a wireless communication device infrastructure, comprising:

a Session Internet Protocol (SIP) message generator operable to generate a SIP message having a header that includes information derived at least in part from an over-the-air (OTA) protocol message from a wireless communication device that is a non-IP enabled CDMA communication device; and a communications module operable for communicating the SIP message to the wireless communication device infrastructure.

8. A method, comprising:

using extended session initiation protocol (SIP) headers to transmit over-the-air (OTA) protocol parameters within an infrastructure using at least one voice over Internet Protocol (VOIP), such that a protocol other than the VOIP need not be used within the infrastructure to effect call set-up between a wireless communication device and another communication device via the infrastructure, wherein the parameters include a station classmark and the classmark represents power information.

9. A method for facilitating communication between a wireless communication device transmitting information using an over-the-air (OTA) protocol and a telephony infrastructure using IP protocol to communicate information within the infrastructure, comprising:

adding data in at least one Session Initiation Protocol (SIP) message header representing at least one OTA network parameter;

sending a first SIP Invite message containing a full OTA address of an originating wireless endpoint;

receiving a destination address in response thereto; and sending a second SIP Invite message containing only parameters required for SIP VOIP communication and excluding CDMA-specific parameters not required for SIP VOIP communication, wherein the message header is a portion of a SIP Invite Request message.

10. A method, comprising:

using extended session initiation protocol (SIP) headers to transmit over-the-air (OTA) protocol parameters within an infrastructure using at least one voice over Internet Protocol (VOIP), such that a protocol other than the VOIP need not be used within the infrastructure to effect call set-up between a wireless communication device and another communication device via the infrastructure;

sending a first SIP Invite message containing at least some CDMA-specific parameters not required for SIP VOIP communication;

receiving a destination address in response thereto; and sending a second SIP Invite message containing only parameters required for SIP VOIP communication and excluding CDMA-specific parameters not required for SIP VOIP communication.

11. An apparatus, comprising:

means for using extended session initiation protocol (SIP) headers to transmit over-the-air (OTA) protocol parameters within an infrastructure using at least one voice over Internet Protocol (VOIP), such that a protocol other than the VOIP need not be used within the infrastructure to effect call set-up between a wireless communication device and another communication device via the infrastructure;

means for sending a first SIP Invite message containing at least some CDMA-specific parameters not required for SIP VOIP communication;

means for receiving a destination address in response thereto; and means for sending a second SIP Invite message containing only parameters required for SIP VOIP communication and excluding CDMA-specific parameters not required for SIP VOIP communication.

12. An apparatus for facilitating communication between a wireless communication device transmitting information using an over-the-air (OTA) protocol and a telephony infrastructure using IP protocol to communicate information within the infrastructure, comprising:
means for adding data in at least one Session Initiation Protocol message header representing at least one OTA network parameter, wherein the parameter is related to the OTA protocol but not to voice over IP (VOIP) protocol used within the infrastructure, wherein the parameter includes a station classmark and the classmark represents at least the wireless communication device power.

13. An apparatus, comprising:
means for using extended session initiation protocol (SIP) headers to transmit over-the-air (OTA) protocol parameters within an infrastructure using at least one voice over Internet Protocol (VOIP), such that a protocol other than the VOIP need not be used within the infrastructure to effect call set-up between a wireless communication device and another communication device via the infrastructure, wherein the parameters include a station classmark and the classmark represents power information.

14. An apparatus for facilitating communication between a wireless communication device transmitting information using an over-the-air (OTA) protocol and a telephony infrastructure using IP protocol to communicate information within the infrastructure, comprising:
means for adding data in at least one Session Initiation Protocol (SIP) message header representing at least one OTA network parameter;
means for sending a first SIP Invite message containing a full OTA address of an originating wireless endpoint;
means for receiving a destination address in response thereto; and
means for sending a second SIP Invite message containing only parameters required for SIP VOIP communication and excluding CDMA-specific parameters not required for SIP VOIP communication, wherein the message header is a portion of a SIP Invite Request message.

* * * * *